US008302304B2

(12) United States Patent
Stomski

(10) Patent No.: US 8,302,304 B2

(45) Date of Patent: Nov. 6, 2012

(54) WIRE LOCK RING INSERTION TOOL KIT AND METHOD

(76) Inventor: Steven Michael Stomski, Annapolis, MD (US)

( * ) Notice: Subject to any disclaimer, the term of this patent is extended or adjusted under 35 U.S.C. 154(b) by 599 days.

(21) Appl. No.: 12/547,721

(22) Filed: Aug. 26, 2009

(65) Prior Publication Data

US 2010/0050417 A1 Mar. 4, 2010

Related U.S. Application Data

(60) Provisional application No. 61/092,421, filed on Aug. 28, 2008.

(51) Int. Cl.
*B23P 15/10* (2006.01)
*B23P 19/02* (2006.01)

(52) U.S. Cl. ........... 29/888.05; 29/222; 29/468; 29/525; 29/888.04

(58) Field of Classification Search .................... 29/222, 29/275, 464, 468, 525, 888.04, 888.05
See application file for complete search history.

(56) References Cited

U.S. PATENT DOCUMENTS 1,740,590 A 12/1929 Hartman
2,357,139 A 8/1944 Scme
3,132,414 A 5/1964 De Bacco
4,226,013 A 10/1980 Helesfai
5,253,406 A 10/1993 Shere
5,802,694 A 9/1998 Myles
6,507,985 B1 1/2003 Loughlin
6,722,011 B1 4/2004 Bacon
6,789,313 B2 9/2004 Hendricks
6,993,816 B2 2/2006 Greenhill
7,080,432 B2 7/2006 Norwood
2004/0093728 A1 * 5/2004 Hendricks ................ 29/888.042
2008/0295331 A1 12/2008 Stemer

* cited by examiner

*Primary Examiner* — Alexander P Taousakis

(57) ABSTRACT

A process is disclosed for inserting a piston pin wire lock ring, particularly Circlips, into a locking groove of a wrist pin bore of a piston. The wire lock ring is radially pre-compressed and thus reduced in size in such a manner that its outside diameter is smaller than the inner diameter of the piston wrist pin bore, by insertion of the ring into a sleeve/tube. While still in the sleeve/tube, the wire lock ring is subsequently inserted, in its compressed state, into the pin bore where it is then uncompressed and released into the locking groove of the piston bore through the use of a plunger inserted in the sleeve/tube to push the lock ring past the end of the sleeve/tube.

1 Claim, 4 Drawing Sheets

WIRE LOCK RING INSERTION TOOL KIT AND METHOD

CROSS-REFERENCE TO RELATED APPLICATIONS

This application claims the benefit of provisional patent application Ser. No. 61/092,421, filed 28 Aug. 2008 by the present inventor.

FEDERALLY SPONSORED RESEARCH

Not Applicable

SEQUENCE LISTING

Not applicable

TECHNICAL FIELD

This invention relates to an assembly tool and method used in an internal combustion engine, a compressor, or the like. More specifically, it is used for the installation of a wire lock ring (also popularly known as C Clip, Snap Ring, Piston Pin Lock Ring, and Circlip, amongst other names), allowing the retention of the piston wrist pin in the piston cross bore.

BACKGROUND

The subject invention consists of a tool used to install a fastener on a work piece and the method of installing such a fastener. More specifically, this invention consists of a hand tool kit used to install a wire lock ring, thus retaining a wrist pin in a piston cross bore that holds a piston to a connecting rod. There is further appreciation in that such an invention has broader applications. Other desirable objects, advantages and results of the invention will become apparent from the following detailed description, taken in conjunction with the accompanying drawings, which illustrate preferred embodiments of the invention, but are not intended to limit its application, composition or otherwise restrict it use. This invention is both a useful, simple tool and a timesaver for many applications where internal insertion into a grooved bore of a wire lock ring is required.

PRIOR ART

The assembly problem of a wrist pin retainer has been addressed for as many years as wrist pins have had a need to be retained. Indeed, for more than 100 years wire lock rings have been used to retain wrist pins, and for those same 100 plus years the insertion of the rings has frustrated engineers and mechanics alike. Either to address the issue of wrist pin retention or to address the difficulty of wire lock ring insertion, numerous technologies have been proposed including: spiral lock rings; U.S. Pat. No. 5,076,149 Everts 1991 (deforming ends of the circlips to hold fast); wire lock rings with tabs for compressing with pliers during insertion; wire lock rings with a "dog leg" for anchoring during insertion, etc. Despite these alternatives and other approaches, however, the fact remains the same that the wire lock ring is a standard in the industry that exists and its insertion must be addressed.

A review of the industry and of patents reveals several tools and systems, all of which require undue pressure and/or force on the piston assembly, are too large for use in certain restricted areas, are cumbersome and awkward to use, or require custom and complicated designs. U.S. Pat. No. 7,080,432 B2 Norwood 2006 shows a dual purpose tool used to insert either a wire lock ring or a spiral lock ring in a piston assembly. Norwood's invention is not pertinent to the instant proposed patent because his invention requires the user to present the tool at a severe angle to the wrist pin bore of the piston as it is inserted and then rotate it around the bore to complete installation, thus prohibiting its use in constricted applications where other pistons, cylinders, and/or engine components interfere with the angle of attack of said tool. Moreover, given the resiliency of the spring steel of the wire lock rings, use of Norwood's invention does in fact require significant pressure (contrary to the assertions of the inventor) to compress the ring as the tool is angled into the bore of the piston. This pressure can easily cause stress to the piston, its rings, the connecting rod, and the surrounding parts of the engine.

U.S. Pat. No. 6,789,313 B2 Hendricks 2004 contemplates a pusher and tube assembly by which a circlip is compressed in the tube by way of an internal, inward taper, keeping the tool and circlip perpendicular at all times. Hendricks' invention requires specific tubes for each type and size of piston profile and pushers to match the internal diameter of the wrist pin into which the pusher must slide. Also, Hendricks' invention requires significant space to operate.

U.S. Pat. Application Publication No. US 2008/0295331 A1 Stemer 2008 shows a multi-part tool by which the user inserts a circlip into an internal tapered "pin bore" by way of a "tightening pin," and then mated to a "stop pin" that is run through the center diameter of the wrist pin—all parts necessarily aligned parallel to the longitudinal axis at all times. Stemer's invention requires specific tubes for each type of piston profile and size and pins to match the internal diameter of the wrist pin into which the pusher must slide, as well as significant room to work the tool from both sides of the piston—not always possible in some applications.

U.S. Pat. No. 6,507,985 B1 Loughlin 2003 shows a sleeve member with an internal tapered passage and plunger assembly by which the sleeve is aligned with the wall of the piston, the circlip inserted into the sleeve, the plunger assembly inserted into the sleeve, and then into the internal diameter of the wrist pin. Loughlin's invention requires specific sleeves for each type of piston profile and pushers to match the internal diameter of the wrist pin into which the pusher must slide, as well as significant manipulation room in order to engage all component parts of the tool and keep them perpendicular during use.

The subject invention addresses the shortcomings of the foregoing art and thus provides the following benefits:

- decreases engine assembly time for inserting circlips;
- avoids marring of pistons with general-purpose tools now commonly used for inserting (i.e., screwdrivers);
- decreases worker/technician fatigue;
- avoids possible injury from use of general purpose tools when the tool slips and gouges the worker/technician;
- allows for one size tool to fit all applications within that range (i.e., a 22 mm tool will work on all pistons with 22 mm wrist pins: the same tool can be used on a variety of piston profiles regardless of wrist pin offset, ring (e.g., oil scavenge ring) configuration, and internal diameter of wrist pin;
- requires minimal space to maneuver tool: the tool can accomplish its purpose in very tight spaces, avoiding interference with other pistons, cylinders, and engine component parts;
- does not require component tool parts or circlip to be kept at right angles, parallel, or aligned along any axis;

requires very small angle of attack, thus allowing for full tool use in very restricted areas;

allows insertion of wire lock ring in the tube/sleeve of the tool prior to insertion into the piston, thus the stress of compressing the circlip has already been accomplished away from the engine, eliminating any stress, twisting, or leverage on the piston (or its very fragile piston rings) while it is on the engine.

BRIEF DESCRIPTION OF THE INVENTION

The insertion of a wire lock ring into a grooved bore, to establish a wrist pin abutment, is a frustrating and difficult task. The present invention, comprising a sleeve/tube and plunger, provides a remedy for the woes of the mechanic in installing the wire lock rings. The present invention allows the mechanic to compress the wire lock ring into a sleeve/tube before installing it into the bore of the piston, and then use a plunger to press the wire lock ring out of the sleeve/tube and into the wrist ping bore. By compressing the wire lock ring in a controlled fashion, prior to installing it into the wrist pin bore, without having to contort to access a remote piston wrist pin bore, the mechanic can spare the engine component parts undue stress and abuse, spare his or her physical well being, and save time looking for lost wire lock rings that have flown across the shop, or worse, into the engine itself. The simple design of the present invention, comprising a sleeve/tube and plunger, and without any intricate or complicated mechanism, allows the mechanic to quickly install the wire lock rings smoothly and safely.

DRAWINGS

DRAWINGS

Reference Numerals

| | |
|---|---|
| 1 | Sleeve/Tube |
| 2 | Sleeve/Tube Outside Diameter (small end) |
| 3 | Sleeve/Tube Inside Diameter |
| 4 | Sleeve/Tube Outside Diameter (large end) |
| 5 | Sleeve/Tube length |
| 6 | Plunger Diameter (small end) |

-continued

| | |
|---|---|
| 7 | Plunger Length |
| 8 | Plunger Head Diameter (large end) |
| 9 | Blind Tapped Hole |
| 10 | Plunger |
| 15 | Wire Lock Ring (Circlip) |
| 17 | Opening of Wire Lock Ring |
| 20 | Screwdriver |
| 37 | Wrist Pin Bore of Piston Assembly |
| 38 | Piston Assembly |

DETAILED DESCRIPTION

Figure 1:
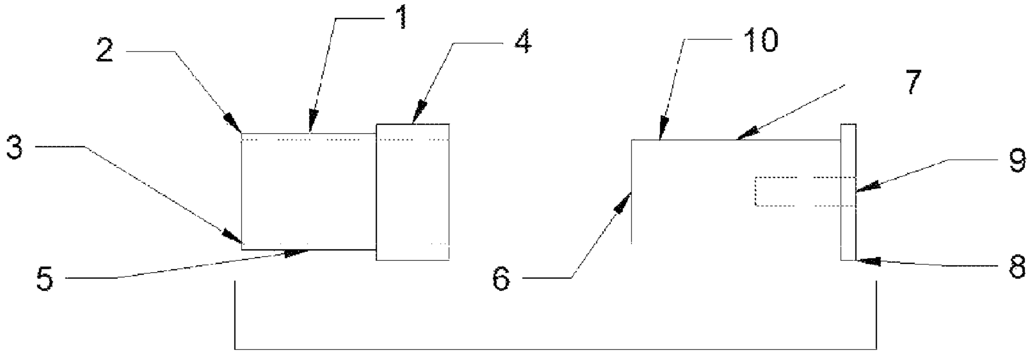
FIG. 1 shows an engineer's drawing of the side view of the plunger and the sleeve/tube.

FIG. 1 shows the sleeve/tube and plunger. 1 represents the sleeve/tube. 2 represents the outside diameter ("OD") of the sleeve/tube. Each application will require a specific diameter sleeve/tube to correspond to the diameter of the wrist pin bore in the piston assembly. The sleeve/tube OD is approximately 0.010" smaller than the bore (37) thus allowing free and easy insertion of the sleeve/tube into the bore.

The inside diameter ("ID") of the sleeve/tube 3 should be large enough to accept the compressed wire lock ring 15 without over compressing it and thus distorting or otherwise stressing it. 3 must be large enough to not over stress the wire lock ring 15, yet not so large as to sacrifice the wall thickness of the sleeve/tube 1. If the sleeve/tube wall thickness is too thin, the wall of the sleeve/tube will be deformed by the hard edge of the wire lock ring as it is pressed into the tube/sleeve. 4 shows the larger OD portion of the sleeve/tube that provides the tool with more rigidity and provides space for knurling to provide better grip for installation of the tool into the bore and during installation of the wire lock ring into the sleeve/bore. 5 represents the length of the sleeve/tube's small diameter, the length of which must be long enough to insert past the outside of the piston and into the bore of the piston assembly to the ring groove itself.

10 represents the plunger itself. 6 shows the outside diameter ("OD") of the plunger that is approximately 0.010" smaller than the inside diameter of the sleeve/tube 3. Since the OD of the plunger is slightly smaller than the ID of sleeve/tube, the plunger slides smoothly without interference through the sleeve/tube.

7 shows the length of the plunger as longer than the length of the sleeve/tube (length of 4 plus length of 5). With the plunger length longer than the sleeve/tube length, the plunger will be able to push the wire lock ring past the end of the sleeve/tube and into the groove of the bore of the piston assembly 37.

8 shows the head of the plunger which will allow the user to have a surface upon which to push the plunger into the sleeve/tube 1. The head of the plunger 8 will also ensure a positive stop to prevent the plunger from being pushed too far into the sleeve/tube 1 or into the piston wrist pin bore 37. The diameter of the head 8 is larger than the ID of the sleeve/tube 1.

9 shows a blind tapped hole for attachment of an extension to the plunger to allow for more leverage or additional manipulation.

Figure 2:
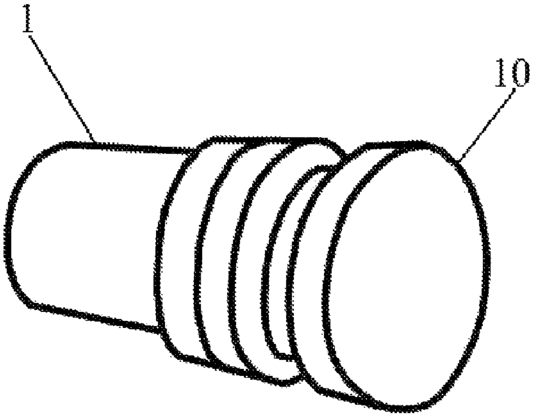
FIG. 2 shows the assembled invention with the plunger inserted into the sleeve/tube.

FIG. 2 shows the insertion of plunger 10 into sleeve/tube 1 through the large OD end of the sleeve/tube 1.

Figure 3:
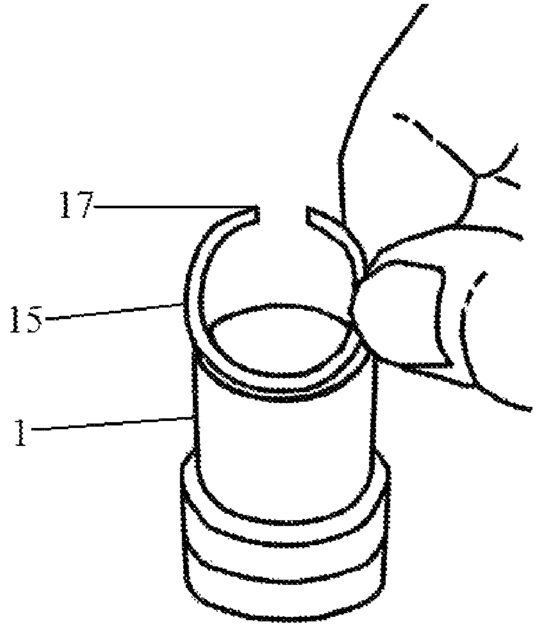
FIG. 3 shows a wire lock ring as it is prepared to be inserted into the sleeve/tube.

FIG. 3 shows a wire lock ring 15 as it is being prepared for insertion into the sleeve/tube 1. The closed end of the wire lock ring is inserted first into the sleeve tube, while the open end of the wire lock ring 17 is opposite of the opening.

Figure 4:
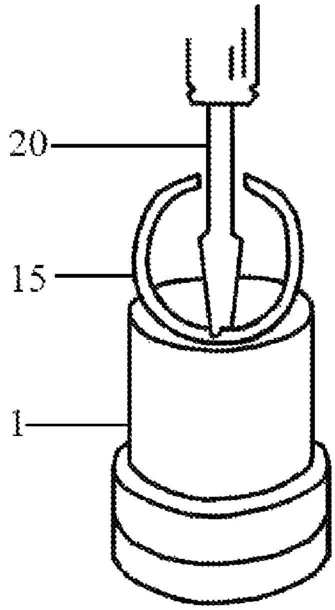
FIG. 4 shows a wire lock ring as it is inserted into the sleeve/tube with the aid of a flat-blade screwdriver.

FIG. 4 shows the use of a flat blade screwdriver 20 to compress the wire lock ring 15 to fit into the sleeve/tube 1.

Figure 5:
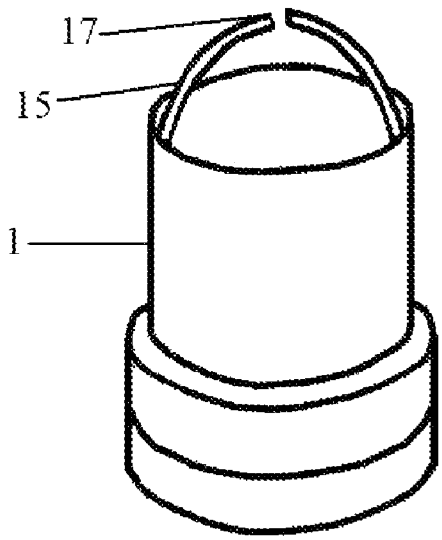
FIG. 5 shows a wire lock ring inserted into the sleeve/tube.

FIG. 5 shows the wire lock ring 15 compressed into the sleeve tube 1, with the open portion of the wire lock ring 17 protruding above the edge of the sleeve/tube.

Figure 6:
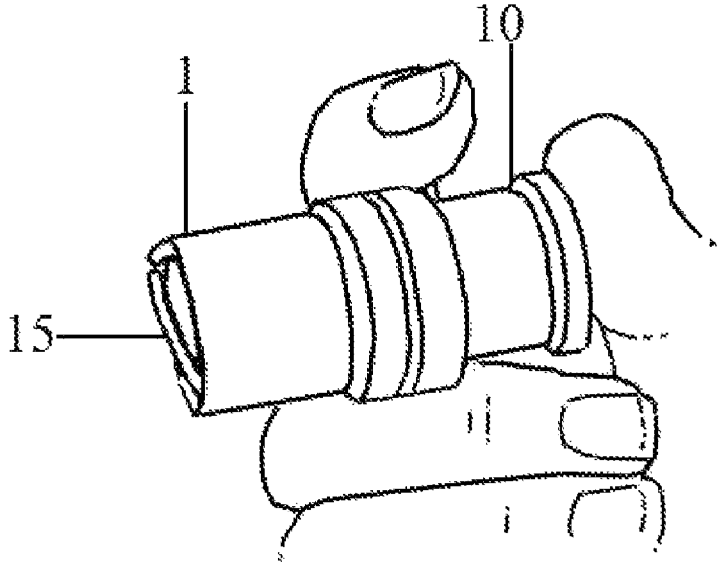
FIG. 6 shows the assembled invention with the wire lock ring inserted in the tool, the plunger in the sleeve/tube, and with the invention held in the hand of the user.

FIG. 6 shows the assembled tool with the plunger 10 inserted into the sleeve/tube 1. The wire lock ring 15 is compressed in the sleeve/tube 1 and the plunger 10 is pressed against the ring. The wire lock ring 15 continues to protrude from the sleeve/tube 1 and is recessed only slightly below the opening of the sleeve/tube 1. The wire lock ring is at an acute angle in the sleeve/tube 1, not parallel to the axis of the tool or at a right angle to the face of the plunger 10. The compressed wire lock ring 15 is now toward the opening/edge of the sleeve/tube 1.

Figure 7:
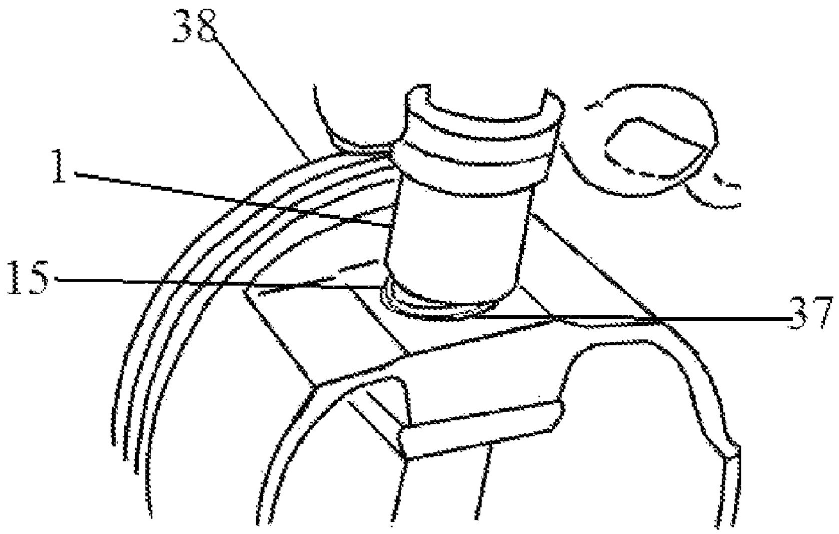
FIG. 7 shows a piston assembly with a piston wrist pin bore as the invention with the compressed wire lock ring in place is presented to the wrist pin bore of the piston.

FIG. 7 shows a piston assembly 38 with a piston wrist pin bore 37 as the sleeve/tube 1 with the compressed wire lock ring 15 is presented to the bore 37. As in FIG. 6, the wire lock ring 15 continues to protrude from the sleeve/tube 1 and is recessed only slightly below the opening of the sleeve/tube 1. The wire lock ring 15 continues to be at an acute angle in the sleeve/tube 1, not parallel to the axis of the tool or at a right angle to the face of the plunger 10. The base (closed portion) of the wire lock ring 15 touches the wall of the tube/sleeve 1 where it also contacts the edge of the face of the plunger 10.

Figure 8:
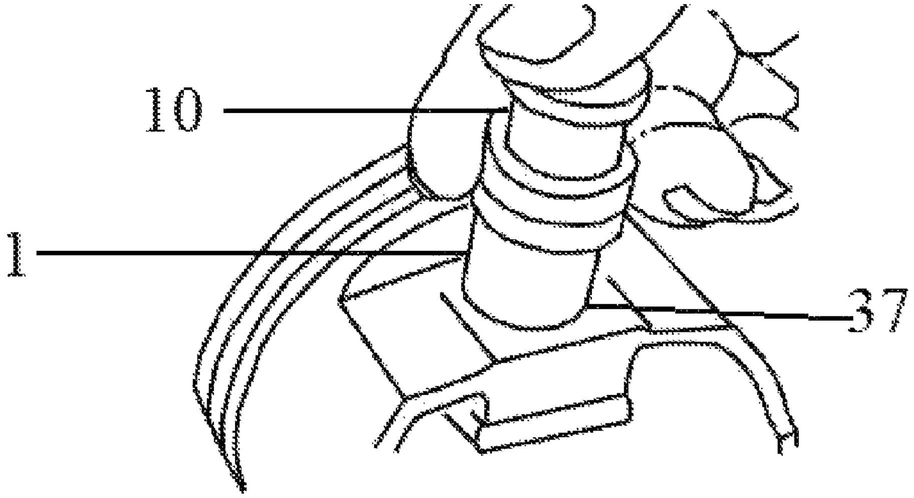
FIG. 8 shows the invention as it is inserted into the bore of the piston assembly as the plunger is being pressed into the sleeve/tube and sleeve/tube pulled back.

FIG. 8 shows the invention as it is inserted into the bore of the piston assembly 37 and as the plunger 19 is being pressed into the sleeve/tube 1 and the sleeve/tube pulled back.

Operation

Operation preferred embodiment of the invention comprises inserting a piston pin locking ring into a locking groove of a pine bore of a piston, provides means for receiving, holding, and fixing the piston pin locking ring, in a pretightened state and for transferring and introducing the pretightened piston pin locking ring into the pin bore, the means including a cylindrical tube/sleeve comprising a first end with an outside diameter corresponding to the piston bore, less approximately 0.010" and an inside diameter to accommodate a compressed wire lock ring. The length of said tube/sleeve to be long enough to enable insertion of the tube/sleeve carrying the compressed wire lock ring into the groove in the bore and wherein the second end of the tube/sleeve comprising a large outside diameter end to allow the tool to be manually grasped by the user during insertion of the wire lock ring into it and during insertion of the tool kit into the bore, with the outside diameter of the second end of the tube/sleeve to be larger than the first end of the sleeve/tube to provide rigidity for the tool and additional surface area for manual manipulation. The inside diameter of the second end of the sleeve/tube to be a constant diameter and contiguous to the first end of the sleeve/tube. The plunger, that is inserted into said sleeve/tube has a diameter that is approximately 0.010" smaller than the inside diameter of the tube/sleeve, thus allowing the plunger to slide smoothly without interference into the tube/sleeve. The length of said plunger being longer than the tube/sleeve to enable the plunger to push the piston pin locking ring past the end of the tube/sleeve and into the groove of the bore of the piston assembly. Said plunger having a head that will allow the user to have a surface upon which to push the plunger into the tube/sleeve where such head also ensures a positive stop to prevent the plunger from being pushed too far into the tube/sleeve or into the piston wrist pin bore and where the diameter of the head is larger than the inside diameter of the tube/sleeve. The head of the plunger also having a blind tapped hole for attachment of an extension to the plunger to allow for more leverage or easier manipulation depending upon the specific application.

Wherein the said tube/sleeve is placed on a hard surface with first end pointing up (FIG. 3), and then the closed end of a piston pin locking ring is placed across the opening of the tube/sleeve (FIG. 3) and approximately ½ the diameter of the piston pin locking ring inserted into the tube/sleeve by pressing down on the tips of the exposed piston pin locking ring until it is compressed into the tube/sleeve just past the opening of the tube/sleeve (FIG. 4), leaving the remaining ½ of the piston pin locking ring protruding from the tube/sleeve (FIG. 5). Then the plunger is inserted tube/sleeve from the second end, and while the open end of the piston pin locking ring is protruding from the tube/sleeve, sliding said plunger against the closed end of the piston pin locking ring, ensuring the piston pin locking ring remains in the tube/sleeve (FIG. 6). The plunger is then pushed further into the tube/sleeve, by tilling and aligning the piston pin locking ring, ensuring that it is no longer vertically oriented in the tube/sleeve or parallel to the centerline of the tube/sleeve, as in FIG. 5 but is at an acute angle inside the tube/sleeve. The closed end of the piston pin locking ring, now being just below the lip of the tube/sleeve, contacts both the wall of the tube/sleeve and the edge of the face of the plunger. The piston pin locking ring is slanted at an angle inside the tube/sleeve, with the open end of the piston in locking ring protruding slightly past the opening of the tube/sleeve. The tube/sleeve is gasped between fingers and the thumb pressed against the head of the plunger (FIG. 6). With the piston pin locking protruding from the tube/sleeve, the tool assembly is presented into the wrist pin hole of the piston (FIG. 7). The tool assembly is pressed firmly against the wrist pin until the portion of the piston pin locking ring that protrudes from the tube/sleeve is partially in its groove adjacent to the wrist pin in the piston, and pushing firmly with thumb against the plunger, the tube/sleeve pulled back until the piston pin locking ring is ejected from the tube/sleeve and expands fully into its groove in the piston adjacent to wrist pin (FIG. 8).

CONCLUSIONS, RAMIFICATIONS, AND SCOPE

Accordingly, based upon the foregoing, the reader will see that the instant invention clearly is more useful than any of the prior art in that it allows for one size tool to be used on numerous applications regardless of style or profile of piston. The instant invention is more elegant in its simplicity than the prior art in that it has fewer parts and is more versatile in its application. Moreover, the instant invention provides a novel and original method and device to quickly, conveniently, and safely insert wire lock rings, with no known tool offering similar or competing features. This new and useful invention allows the user flexibility in its use by allowing the user to insert the wire lock ring by way of the invention at angles not strictly determined or dictated by the tool. The invention can be used, unlike the prior art, in assembly situations requiring close quarter operation, thus providing access to an otherwise restricted piston and its cross bore. The invention reduces fatigue of the technician and reduces assembly time by simplifying the challenging task of wire lock ring insertion, and ensures that no stress is placed on any of the assemblies. With eliminated damage to component parts, eliminated threat of personal injury, and reduced assembly times, the instant invention clearly provides new, useful, and novel advantages over the prior and existing art.

Although the description above contains many specifications, these should not be construed as limiting the scope of the embodiments, but as merely providing illustrations of some of the presently preferred embodiments. For example, the invention can be manufactured to other proportions to allow for applications requiring special needs, or can be used in any application, other than engine or piston assembly, requiring insertion of wire lock rings. Also, the instant invention can be used for insertion of any style internal diameter retaining devices, other than the wire lock ring style, such as Rotor Clip Retaining Rings.

Thus the scope of the embodiments should be determined by the appended claims and their legal equivalents, rather than just specifically by the examples given.

The invention claimed is:

1. A method of inserting a piston pin locking ring into a locking groove of a pin bore of a piston, the method which comprises:

providing means for receiving, holding, and fixing the piston pin locking ring, in a pre-tightened state and for transferring and introducing the pre-tightened piston pin locking ring into the pin bore, the means including a cylindrical tube/sleeve comprising a first end with an outside diameter corresponding to the piston wrist pin bore, less approximately 0.010", and an inside diameter to accommodate a compressed wire lock ring;

providing the length of said tube/sleeve to be long enough to enable insertion of the tube/sleeve carrying the compressed wire lock ring into the groove in the bore;

providing the second end of the tube/sleeve comprising a large outside diameter end to allow the tool to be manually grasped by the user during insertion of the wire lock ring into it and during insertion of the tool kit into the bore, with the outside diameter of the second end of the tube/sleeve to be larger than the opposite end of the sleeve/tube to provide rigidity for the tool and additional surface area for manual manipulation;

providing the inside diameter of the second end of the sleeve/tube to be a constant diameter and contiguous to the first end of the sleeve/tube;

providing a plunger with a diameter that is approximately 0.010" smaller than the inside diameter of the tube/sleeve, thus allowing the plunger to slide smoothly without interference into the tube/sleeve;

providing the length of the plunger being longer than the tube/sleeve to enable the plunger to push the piston pin locking ring past the end of the tube/sleeve and into the groove of the bore of the piston assembly;

providing the plunger having a head that will allow the user to have a surface upon which to push the plunger into the tube/sleeve where such head also ensure a positive stop to prevent the plunger from being pushed too far into the tube/sleeve or into the piston wrist pin bore and where the diameter of the head is larger than the inside diameter of the tube/sleeve;

providing the head of the plunger having a blind tapped hole for attachment of an extension to the plunger to allow for more leverage or easier manipulation depending upon the specific application;

placing the tube/sleeve on a hard surface with first end pointing up;

placing the closed end of a piston pin locking ring across the opening of the tube/sleeve and inserting approximately ½ the diameter of the piston pin locking ring into the tube/sleeve by pressing down on the tips of the exposed piston pin locking ring until it is compressed into the tube/sleeve just past the opening of the tube/sleeve, leaving the remaining ½ of the piston pin locking ring protruding from the tube/sleeve;

sliding the plunger into the tube/sleeve from the second end, and while the open end of the piston pin locking ring is protruding from the tube/sleeve, sliding said plunger against the closed end of the piston pin locking ring, ensuring the piston pin locking ring remains in the tube/sleeve;

pushing the plunger further into the tube/sleeve, by tilting and aligning the piston pin locking ring, ensuring that it is no longer vertically oriented in the tube/sleeve or parallel to the centerline of the tube/sleeve, but is at an acute angle inside the tube/sleeve;

ensuring that the closed end of the piston pin locking ring, now being just below the lip of the tube/sleeve, contacts both the wall of the tube/sleeve and the edge of the face of the plunger;

ensuring that the piston pin locking ring is slanted at an angle inside the tube/sleeve, and that the open end of the piston pin locking ring protrudes slightly past the opening of the tube/sleeve;

grasping the tube/sleeve between fingers and pressing with thumb against the head of the plunger, with the piston pin locking ring protruding from the tube/sleeve, presenting the tool assembly into the wrist pin hole of the piston;

pushing the tool assembly firmly against the wrist pin until the portion of the piston pin locking ring that is protruding from the tube/sleeve is partially in its groove adjacent to the wrist pin in the piston, pushing firmly with thumb against the plunger, pulling back on the tube/sleeve until the piston pin locking ring is ejected from the tube/sleeve and expands fully into its groove in the piston adjacent to the wrist pin.

* * * * *